United States Patent [19]

Stock

[11] 4,257,639
[45] Mar. 24, 1981

[54] EJECTOR DEVICE FOR STORES

[75] Inventor: William H. Stock, Columbus, Ohio

[73] Assignee: Rockwell International Corporation, Segundo, Calif.

[21] Appl. No.: 104,219

[22] Filed: Dec. 17, 1979

[51] Int. Cl.³ .............................................. B64D 1/12
[52] U.S. Cl. ................................. 294/83 R; 89/1.5 G; 89/1.5 F; 244/137 R; 294/88; 294/100; 294/83 AE
[58] Field of Search ............ 294/83 R, 83 A, 83 AA, 294/83 AB, 83 AE, 86 A, 86.15, 86.17, 86.28, 86.3, 86.32, 86.33, 88, 99 R, 100, 116; 89/1.5 R, 1.5 B, 1.5 E, 1.5 F, 1.5 G, 1.5 H; 244/118.1, 137 R

[56] References Cited

U.S. PATENT DOCUMENTS

| | | | |
|---|---|---|---|
| 2,796,284 | 6/1957 | Benson et al. | 294/83 AA |
| 3,059,956 | 10/1962 | Geffner | 294/83 AA |
| 3,181,908 | 5/1965 | Clark | 294/83 R |
| 3,810,671 | 5/1974 | Jeffery | 294/83 R X |
| 3,883,097 | 5/1975 | Billot | 244/137 R |
| 4,132,147 | 1/1979 | Contaldo | 244/137 R X |

Primary Examiner—Johnny D. Cherry
Attorney, Agent, or Firm—Louis L. Dachs; Charles T. Silberberg

[57] ABSTRACT

A device is disclosed for ejecting a store from an aircraft stores rack. The device comprises a tubular member having an internal bore along its longitudinal axis. A plurality of resilient lug retainer fingers are attached at one end of the tubular member and extend about and parallel to the longitudinal axis of the tubular member, movable from a first position, in engagement with a lug mounted on the store, to a second position, disengaged from the lug. A collar is mounted about the tubular member movable from a first position, wherein the collar holds the retaining fingers in engagement with the lug, to a second position, wherein the collar is disengaged from the retaining fingers. An ejector ram is mounted within the bore of the tubular member. An actuation system is provided which is adapted to first move the collar from the first to the second position and, afterwards, drive the ram into the lug causing the retaining fingers to move from the first to the second position, thus disengaging the retainer fingers from the lug, and forcibly ejecting the store from the aircraft.

9 Claims, 3 Drawing Figures

EJECTOR DEVICE FOR STORES

BACKGROUND OF INVENTION

1 Field of Invention

The invention relates to the field of store ejectors for an aircraft, and particularly to a device which both supports and ejects the stores.

2 Description of Prior Art

A stores rack must provide a suspension support that has a highly reliable releasing mechanism. Furthermore, on modern high-speed, and particularly supersonic aircraft, the capability to forcibly eject the weapon from the rack must be provided, for gravity release is often unsafe at these speeds. This is because the airflow around the aircraft is so turbulent that there is a tendency for the store to either "fly" along with the aircraft or change pitch angle; or even hit other stores. Because of this turbulent airflow and, additionally, to resist high G loads, sway bracing in the lateral plane is a necessity. The three basic functions, suspension, ejection, and sway-bracing, are usually accomplished by separate components within the bomb rack.

A typical stores suspension system is disclosed in U.S. Pat. No. 3,883,097, "Device for Picking Up and Ejecting Loads Under an Airplane," by Billot. Billot uses a ball detent device which engages recesses within the weapon. Release is accomplished by withdrawing a cam within the detent, allowing the balls to withdraw. But, because of the internal cam and linkage system, a separate store ejector mechanism is required. This, of course, adds weight to the aircraft. Another example of a bomb rack having separate suspension and ejecting mechanisms is U.S. Pat. No. 4,049,222, "Ejector Rack for Nuclear Stores," by Peterson.

There are numerous prior art methods of combining ejection and suspension systems. For example, U.S. Pat. No. 3,877,343, "Stores Carriers," by Newell, et al. Newell discloses a system wherein a pair of jaws engage a lug on the store, and are held in contact with the lug by a pair of roller cams. A spring-biased plunger in contact with the lug is used for ejection. Upon actuation, the roller cams are moved to a position whereby the jaws may open due to the weight of the weapon itself. After the jaws have opened, the spring-biased plunger ejects the store. Newell's design has no safety provisions to prevent inadvertent release of the weapon. Furthermore, there is no integral sway bracing. Finally, the overall system is quite bulky.

Another example is provided in U.S. Pat. No. 3,810,671, "Jettison Device for Helicopter Load Carrying System," by Jeffery. The Jeffery device comprises a housing in which a pair of jaws are locked into engagement with a lug mounted on a store by an explosively actuated piston rod. Upon actuation, movement of the piston rod releases the jaws and the rod ejects the store pushing the jaws out of the way. As in the previous example, there is no method of preventing inadvertent actuation and, additionally, no integral sway bracing. Furthermore, Jeffery's concept would be somewhat difficult to reset.

A further example of a combined suspension and injector system can be found in U.S. Pat. No. 3,059,956, "Combined Shackle and Ejector Mechanism for Stores," by Geffner. Geffner discloses an ejector assembly movably mounted in a housing and secured in the retracted position by a ball detent assembly. The ejector assembly is explosively actuated, but movement is prevented by the detent so that inadvertent actuation of the explosive cartridge will not release the store. The suspension means is a rotating hook mounted at the end of the ejector assembly. In the retracted position, a cam at the opposite end of the hook is locked into engagement with the lug on the store by a retainer cup on the housing. Actuation is accomplished by release of the detent which allows the ejector assembly to extend, releasing the hook. Upon actuation of the cartridge the stores are ejected. While Geffner does provide additional safety features it is extremely complicated and, further, does not provide integral sway bracing.

Other examples of stores racks are: U.S. Pat. No. 3,009,730, "Ejector for External Carried Stores," by Gantschnigg, et al. U.S. Pat. No. 3,435,725, "Store Launching System," by Miller; U.S. Pat. No. 2,949,822, "Bomber Lease Mechanism," by Musser; and U.S. Pat. No. 3,610,094, "Ejector Release Units for Release in Aircraft," by Graigie.

High speed maneuvers and airflow induced vibrations also induce loads in the lateral plane, which, also, must be absorbed. Thus, sway braces are provided to restrain the store in the lateral plane. These are normally forged arms protruding from the rack with manually adjustable pads to accomodate varying store diameters. A typical prior art sway brace is disclosed in the Geffner reference. Manually adjusting such sway braces is time consuming for they are often difficult to reach within store bays because of limited access.

It is obvious from this brief review of the prior art that there exists no highly reliable combination ejector, suspension, and sway brace mechanism for an aircraft mounted stores rack, which also provides increased safety in that inadvertent actuation of the ejector system will not release the store.

It is, therefore, a primary object of this invention to provide a store suspension system having an integral stores ejector.

It is another object of this invention to provide a store suspension system having both an integral ejector and stores sway brace.

It is a further object of this invention to provide a store suspension system in combination with a stores ejector which incorporates a safety interlock which will prevent inadvertent ejection.

A still further object of this invention is to provide a stores suspension system with integral ejector and sway brace which is both compact and reliable.

SUMMARY OF INVENTION

The invention is a device for releasably engaging a store from an aircraft stores rack. The device comprises a tubular member having an internal bore aligned with the longitudinal axis of the tubular member and which has a plurality of movable lug retaining means attached at one end. The retaining means preferably comprises a plurality of resilient lug retaining fingers attached to the tubular member extending about its longitudinal axis and terminating in protrusions which are directed inwardly toward the longitudinal axis. The plurality of retaining fingers are movable from a first position, wherein notches in the protrusions engage a lug mounted on the store, to a second position wherein the notches are disengaged from the lug. A collar is mounted about the tubular member and movable along the longitudinal axis of the tubular member from a first position, wherein the collar holds the retaining fingers in their first position, to a second position, wherein the collar is disengaged from the retaining fingers.

At least one first fluid pressure cylinder is provided having a first piston therein coupled to the collar. A second fluid pressure cylinder is provided having a piston therein coupled to an ejector ram movably mounted within the bore of the tubular member. The first and second cylinders are provided with first and second gas generators preferably in the form of explosive cartridges. The first gas generator is adapted to fire before the second gas generator, thereby causing the collar to be moved from the first to the second position. Upon actuation of the second gas generator, the ejector ram is driven toward the lug causing the resilient fingers to move from the first position to the second position, and then strike the lug, thereby forcibly ejecting the store.

Preferably, the collar incorporates a surface adapted to mate with a surface on the store with both surfaces being substantially perpendicular to the longitudinal axis of the tubular member, such that the collar acts as a sway brace when in the first position.

It is also preferred to have the lug incorporated in a receptacle within the store, having a vertical wall substantially parallel to the longitudinal axis of the tubular member. The collar is provided with a mating tubular surface adapted to slidably engage the wall, providing additional sway bracing.

The novel features which are believed to be characteristic of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only, and are not intended as a definition of the limits of the invention.

Figure 1:
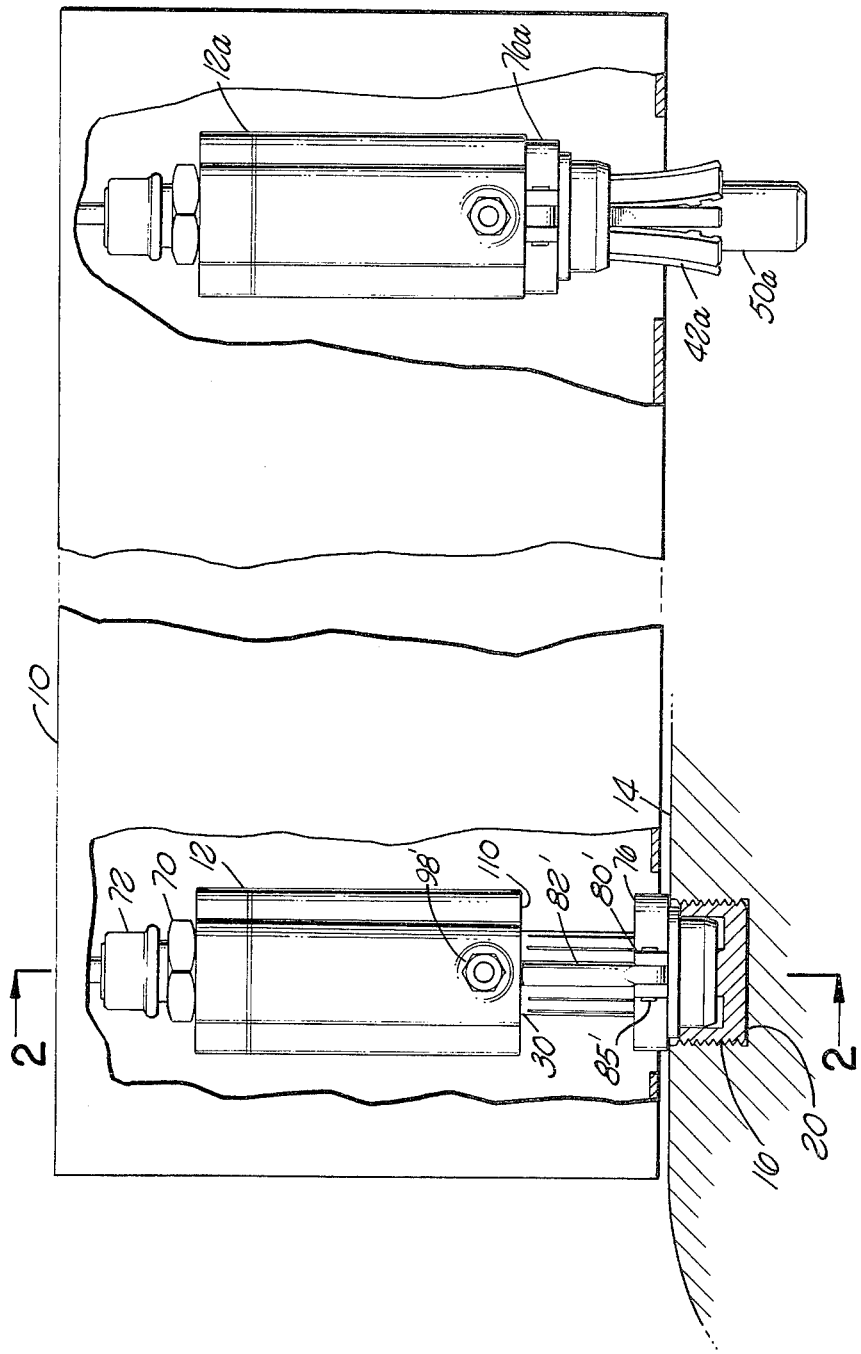
FIG. 1 is a side elevation view of a stores rack partially broken away to show the interior thereof wherein are mounted a pair of combination store suspension, ejector, and sway brace devices, with the forward device shown supporting a store, and the rear device shown in the actuated position.
Figure 2:
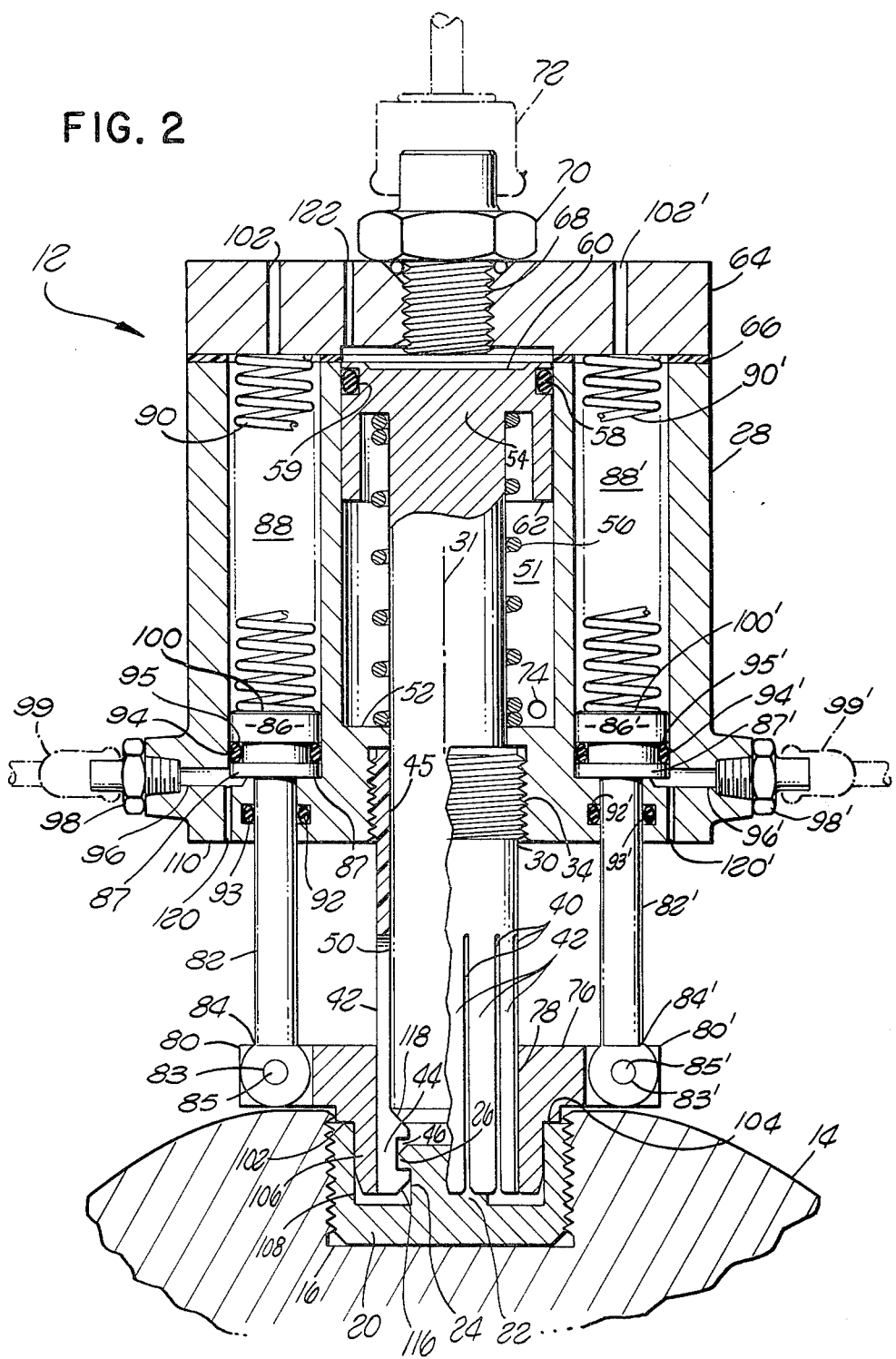

Illustrated in FIG. 2 is a cross-sectional view of the forward device shown in FIG. 1 along the line 2—2.

Figure 3:
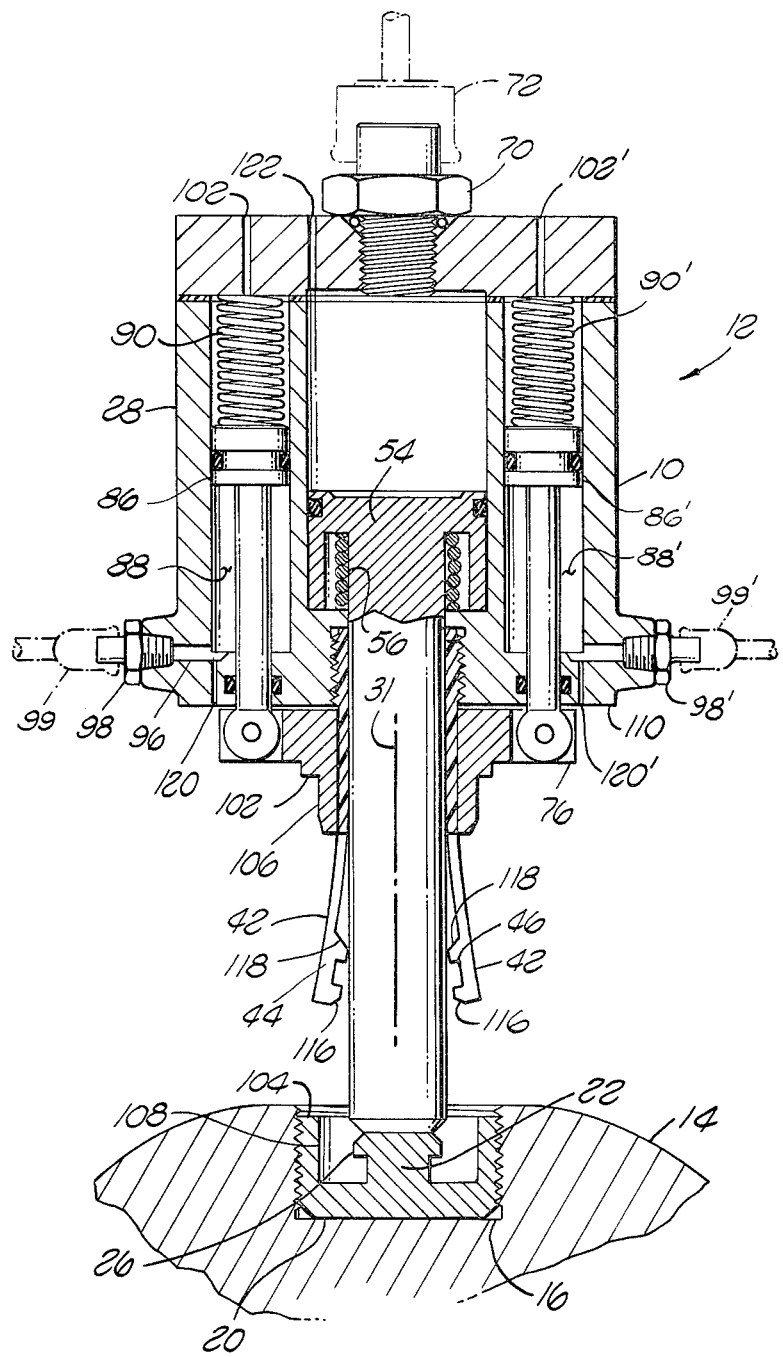

Illustrated in FIG. 3 is a cross-sectional view of the forward device shown in FIG. 1 along the line 2—2 showing the device in the actuated position.

DESCRIPTION OF PREFERRED EMBODIMENT

Illustrated in FIG. 1 is a side elevation view of a stores rack designated by numeral 10 partially broken away to show forward and rear combination suspension, ejection and sway brace devices 12 and 12a for a store 14. Illustrated in FIG. 2 is a cross-sectional view of the device 12 shown in FIG. 1 along the lines 2—2. It can be seen that the store 14 incorporates a standard internally threaded lug attaching receptacle 16. The recess 16 is a standard size adapted to accommodate most attaching fittings or lugs. Installed in the receptacle 16 is an externally threaded lug fitting 20 in the shape of a cylindrical cup having a lug 22 mounted in the center. The lug 22 comprises a stem portion 24 on top of which is attached a disc portion 26.

The device 12 comprises a main body 28 attached to the rack 10 by fastener means (not shown). An externally threaded tubular member 30, having a longitudinal axis 31, is engaged to the internally threaded wall of cavity 34 in the body 28. The bottom portion of the member 30 incorporates a plurality of substantially equally spaced longitudinal slots 40 dividing the lower end of the member 30 into a plurality of resilient lug retaining fingers 42, shown in a first position, in engagement with lug 22. The retaining fingers 42 terminate in protrusions 44 extending inwardly toward the longitudinal axis 31, having internal notches 46 adapted to engage the disc portion 26 of the lug 22.

Movably mounted within a bore 45 of the member 30 is an ejector ram 50 which extends into an actuation cylinder 51 in the body 28 and terminates at one end (furthest from lug 22) in a piston 54. The ram 50 is biased to the upward position by spring 56 which is positioned around ram 50 and bears against piston 54 at one end and end 52 of cylinder 51. A seal in the form of "O" ring 58 mounted in groove 59 seals the upper side 60 from the lower side 62 of the piston 54. The cylinder 51 is sealed by a cap 64 and gasket 66 secured to the body 28 by means of fasteners (not shown). The cap 64 incorporates an internally threaded port 68 in which is mounted a pressure generator preferably in the form of a replaceable electrically initiated gas generating explosive cartridge 70. Attached to the cartridge 70 is an electrical connector 72 which is coupled to an electrical power supply (not shown). A vent port 74 is provided in the body 28 to ensure that no pressure can be built on the side 62 of the piston 54, which might create a resistance to ram travel.

A collar 76 is slidably mounted to the tubular member 30 via aperture 78 therein. The collar 76 incorporates two clevis members 80 and 80'. A pair of piston rods, 82 and 82', are provided having apertures 83 and 83' at their lower ends 84 and 84' respectively, and are joined to the clevis members 80 and 80' by means of clevis pins 85 and 85' respectively. The piston rods 82 and 82' are coupled to pistons 86 and 86' mounted within second pressure cylinders 88 and 88' respectively. The collar 76 is biased downward to a first position wherein the collar locks the retaining fingers 42 into engagement with the lug 22, by means of springs 90 and 90' respectively positioned within cylinders 88 and 88', which bear against cap 64 and pistons 86 and 86'.

The lower sides 87 and 87' of pistons 86 and 86' are sealed off by means of "O" rings 92 and 92' mounted in grooves 93 and 93' in the body 28, and "O" rings 94 and 94' mounted in grooves 95 and 95' in the pistons 86 and 86'. Coupled to the lower sides 87 and 87' of the pistons 86 and 86' are ports 96 and 96' which are adapted to receive second gas generators, preferably in the form of electrically initiated gas generating explosive cartridges 98 and 98' coupled to the electrical power supply (not shown) via connectors 99 and 99'. The upper sides 100 and 100' of pistons 86 and 86' are vented to the atmosphere via ports 102 and 102' within the cap 64. The vents are provided to assure that no pressure can be built up on the upper sides 100 and 100' in offering resistance to the movement of the collar 76. While the use of two second pressure cylinders 88 and 88' are preferred because the tendency of the collar 76 to twist and bind about retaining fingers 42 is eliminated, it is possible to use only one.

The collar 76 can also be adapted to act as a sway brace. For example, a shoulder 102 substantially perpendicular to the longitudinal axis 31 is provided on collar 76 adapted to mate with surface 104 on the lug fitting 20. Additional sway bracing can be provided by adapting the tubular portion 106 of the collar 76 to slidably engage the wall 108 of the lug fitting 20.

Still referring to FIGS. 1 and 2 and additionally to FIG. 3 which is the cross-sectional view of the mechanism shown in FIG. 2, but in the actuated position, the functioning of the mechanism can be easily understood. Assuming that there is no store 14 attached to the device 12, the store 14 is installed in the following manner. The cartridge 98 is removed from the port 96 and a suitable source of pressurizing fluid such as compressed air or hydraulic fluid is coupled to the port 96. The pressure is applied to piston 86 which will move the collar 76 upward until it bottoms against surface 110 of the body 28 (from the first to the second position). This frees the retaining fingers 42. The store 14 is raised until the disc portion 26 of the lug 22 engages an inclined surface 116 on the protrusion 44. Further raising of the store 14 will cause the disc 26 to slide up the inclined surface 116, forcing the retainer fingers 42 to spread apart to a second position, wherein the disc 26 extends past the surface 116 allowing the fingers 42 to snap back with the notches 46 engaging the disc 26 as shown in FIG. 2.

Safety requirements dictate that once so engaged, the store 14 must be locked in place. Therefore, the fingers 42 must be made of a suitable high strength material such as 17-4 corrosion resistant steel heat treated to 200,000 psi in order to support the load without having the collar 76 in the first position. After the load 14 is in place, the pressure on the piston 86 is reduced, allowing the spring 90 to force the collar to the first position about the retaining fingers 42 such that surface 102 of the collar 76 contacts surface 104 of the lug fitting 20. At this point the store 14 is secured in place. The cartridge 98 is reinserted into the port 96 and electrically connected by attachment of connector 99. It is normal practice to simultaneously mount the store 14 to both the front and rear devices 12 and 12a. Because of possible tolerance build-ups between the devices and between the lugs on the store 14 it may be desirable to provide means (not shown) to adjust the position of one of the devices to accommodate such tolerances.

To release the store 14 an electrical signal from the power supply (not shown) is sent to cartridges 98 and 98' causing them to ignite, producing sufficient gas pressure to drive pistons 86 and 86', and collar 76 upward to the second position. A second electrical signal is then generated, timed to reach cartridge 70 after the collar 76 contacts surface 110 of the body 28, i.e., the second position. The resulting gas pressure forces piston 54 downward such that ram 50 engages an inclined surface 118 of the protrusion 44, causing the retaining fingers 42 to again spread apart to the second position, where the notch 46 disengages from the disc portion 26 of the lug 22, freeing the store 14. The continued downward movement of the ram 50 causes it to strike the lug 22 physically ejecting the load 14. The device 12a shown in FIG. 1 also illustrates this position. Here it can be seen that the collar 76a is in the second position and a ram 50a extended, forcing the retaining fingers 42a to the second position.

Small diameter bleed ports 120 and 120' are provided in the body 28 for venting ports 96 and 96', respectively, to atmosphere. A bleed port 122 is provided in cap 64 for venting the portion of the cylinder 51 above the piston 54 to atmosphere. The bleed ports 120, 120' and 122 are made sufficiently small so as to have little effect on pressure build-up within cylinders 88, 88' and 51 upon ignition of the cartridges 98, 98' and 70, respectively, but after release of the store 14 allow the pressure within the cylinders to return to ambient. After the pressure from the cartridges 70, 98 and 98' has been reduced to ambient (or during the pressure reduction), the spring 56 will raise the ram 50 to the upward position, and springs 90 and 90' will force the collar 76 to the first position.

It should be noted that if the cartridge 70 is inadvertently actuated with the collar 76 in the first position, the store 14 will remain secured to the stores rack 10. Even though the ram 50 will be driven into the protrusions 46 of the retaining fingers 42, the fingers are locked in the first position and the ram will be prevented from traveling further. This is an important safety feature not found in many prior art systems.

It should also be noted that the gas pressure, produced by the cartridge 70, can be changed by varying the explosive charge therein to accommodate different size stores. Furthermore, instead of having the electrical power applied to the cartridges 98, 98' and 70 in sequence, they can be fired simultaneously if cartridge 70 incorporates a suitable explosive delay column (not shown). Furthermore, while the device 12 has been shown using explosively actuated pressure generators, it should be understood that hydraulic or pneumatic pressure could be used to actuate the ram 50 and position collar 76.

While the combination load suspension, ejection, and sway brace mechanism has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

Therefore I claim:

1. A device for releasably engaging a store, said store having a lug mounted thereto, comprising:
    a tubular member having a longitudinal axis and an internal bore substantially aligned with said longitudinal axis, said tubular member having a plurality of lug retaining means attached at one end, said retaining means being movable from a first position, in engagement with said lug, to a second position, disengaged from said lug;
    an ejector ram movably mounted in said bore;
    a collar mounted to said tubular member being movable along said longitudinal axis from a first position, wherein said collar locks said retaining means in said first position, to a second position, wherein said collar is disengaged from said retaining means; and
    actuation means coupled to said collar and adapted to first move said collar from said first position to said second position and, secondly, to drive said ram toward said lug into engagement with said retaining means, such that said retaining means is moved to said second position.

2. The device of claim 1 wherein said actuation means also drive said ram into contact with said lug, thereby forcibly ejecting said store.

3. The device of claim 1 wherein said actuation means comprises:

at least one first fluid pressure cylinder having a first piston therein coupled to said collar;

a second fluid pressure cylinder having a second piston therein coupled to said ram;

a first gas generator coupled to said first cylinder and adapted upon actuation to pressurize said at least one first cylinder, such that said first piston drives said collar from said first piston to said second position; and a second gas generator coupled to said second cylinder and adapted up on actuation to pressurize said second cylinder, such that said second piston drives said ram.

4. The device of claims 2 or 3 wherein said retaining means comprises a plurality of resilient lug retaining fingers attached to said end of said tubular member and extending about and along said longitudinal axis of said tubular member, said retaining fingers having protrusions extending inwardly toward said longitudinal axis of said tubular member, terminating in surfaces having notches adapted to engage said lug.

5. The device of claim 4 wherein said protrusions incorporate:

first and second surfaces disposed on either side of said notch, said first surface inclined at an angle such that upon contact by said driven ram said retaining fingers are moved from said first to said second position, and said second surface inclined at an angle such that upon contact by said lug said retaining fingers are moved from said first to said second position, allowing said lug to engage said notch.

6. The device of claim 2 wherein said collar incorporates a first surface adapted to mate with a second surface on said store, said first and second surfaces being substantially perpendicular to said longitudinal axis of said tubular member, such that said collar acts as a sway brace for said store when said collar is in said first position.

7. The device of claims 2 or 6 wherein said store incorporates a recess and said lug is mounted therein and said collar incorporates a cylindrical surface adapted to engage said recess, such that said collar acts as a sway brace for said store when said collar is in said first position.

8. The device of claim 5 wherein said collar incorporates a first surface adapted to mate with a second surface on said store, said first and second surfaces being substantially perpendicular to said longitudinal axis of said tubular member, such that said collar acts as a sway brace for said store when said collar is in said first position.

9. The device of claim 8 wherein said store incorporates a recess and said lug is mounted therein and said collar incorporates a cylindrical surface adapted to engage said recess such that said collar acts as a sway brace for said store when said collar is in said first position.

* * * * *